United States Patent [19]

Cargnel et al.

[11] Patent Number: 5,329,791
[45] Date of Patent: Jul. 19, 1994

[54] PLASTIC WASHTUB

[75] Inventors: Giuseppe Cargnel, Treviso; Piero Durazzani, Pordenone, both of Italy

[73] Assignee: Zanussi Elettrodomestici S.P.A., Italy

[21] Appl. No.: 981,069

[22] Filed: Nov. 24, 1992

[30] Foreign Application Priority Data

Nov. 27, 1991 [IT] Italy .................. PN91 U 00040

[51] Int. Cl.⁵ ............................................. D06F 37/04
[52] U.S. Cl. ............................................. 68/24; 68/140
[58] Field of Search ............... 68/3 R, 140, 144, 24, 68/58, 23.6, 19.2

[56] References Cited

U.S. PATENT DOCUMENTS

| 4,216,663 | 8/1980 | Shacklock | 68/3 R |
| 4,423,607 | 1/1984 | Munini | 68/140 |

FOREIGN PATENT DOCUMENTS

| 1460840 | 2/1969 | Fed. Rep. of Germany | 68/140 |
| 60-236685 | 11/1985 | Japan | 68/3 R |
| 2-305596 | 12/1990 | Japan | 68/3 R |
| 1155640 | 5/1985 | U.S.S.R. | 68/3 R |
| 2121834 | 1/1984 | United Kingdom | 68/140 |
| 2157326 | 10/1985 | United Kingdom | 68/3 R |
| 2189511 | 10/1987 | United Kingdom | 68/3 R |

Primary Examiner—Frankie L. Stinson
Attorney, Agent, or Firm—Pearne, Gordon, McCoy & Granger

[57] ABSTRACT

A plastic washtub used preferably in household clothes washing machines having a rigid structure (1) formed by a cylindrical wall (2), a circular bottom wall (3), and a circular front wall. A hub (6) is inserted through the central part of the bottom wall. It is called a hub because it is inserted into a central circular hub-housing (7) of the bottom wall (3) and supports the central shaft (11) of the rotor (8) in a known manner. This hub-housing's central portion (7) has around and adjacent to it one or more closed, empty chambers so that the hub-housing (7) does not enter into contact with the washing liquid. It is preferred that, inside the tub, said hub-housing (7) be protected by a plate (15), preferably of plastic, which is attached to ribs on the bottom wall to prevent the washing liquid from directly contacting the hub-housing.

1 Claim, 2 Drawing Sheets

PLASTIC WASHTUB

BACKGROUND OF THE INVENTION

2. Field of the Invention

This invention is a special type of improved plastic washtub used especially in household clothes-washing machines.

2. Description of the Related Art

Plastic washtubs for household clothes-washing machines are known. They substantially comprise a rigid structure forming a cylindrical circumference and a circular bottom wall. Sometimes a separate front wall, also circular in form, suitable for union to the rigid structure is attached to it by means that are also known.

Normally, to increase tub strength, radial ribbing is provided in one piece with the bottom wall, originating from the central area of said rear wall. A hole is made in the central area, into which the driving and supporting shaft of the rotor is inserted inside the tub. Said shaft is shrink-fitted onto a belt-driven pulley outside the tub which drives the rotor.

To support the rotor shaft and allow it to turn with minimal friction, while ensuring a seal to prevent leakage of washing liquid to the outside, the hole is usually fitted with a coaxial hub with bearings for the shaft. The hub is normally held against the inner wall of the hole by the plastic of the tub being stamped directly against the hub. The presence of this hub is necessary to provide both shaft support and tub seal, but has the disadvantage of being directly subject to the relatively high temperatures (up to 90° C.) reached by the washing liquid, which is in direct contact with the central area of the tub's rear wall. In some cases, the action of the high temperature reached in this way by the plastic surrounding and holding the hub generates a succession of thermal shocks, especially in machines in which the washing liquid is recirculated. Because of the mechanical action exerted by the rotating shaft against the hub, it follows that there is progressive stress in the plastic, so that after a certain time it becomes fatigued and its general mechanical characteristics are affected to the point that the seal is broken and the shaft becomes slack in its plastic housing.

SUMMARY OF THE INVENTION

The purpose of this invention is, therefore, to achieve a washtub with superior structural and functional characteristics to those of today's washtubs, which will be resistant over time to the dangers of the wear resulting from play in the hub. The means to this end is a heat-protective "little collar" as described in the attached claims.

BRIEF DESCRIPTION OF THE DRAWINGS

The invention will be better understood from the following description, the purpose of which is only that of a non-limiting example, with reference being made to the attached drawings, of which.

DETAILED DESCRIPTION OF THE PREFERRED EMBODIMENT

Figure 1:
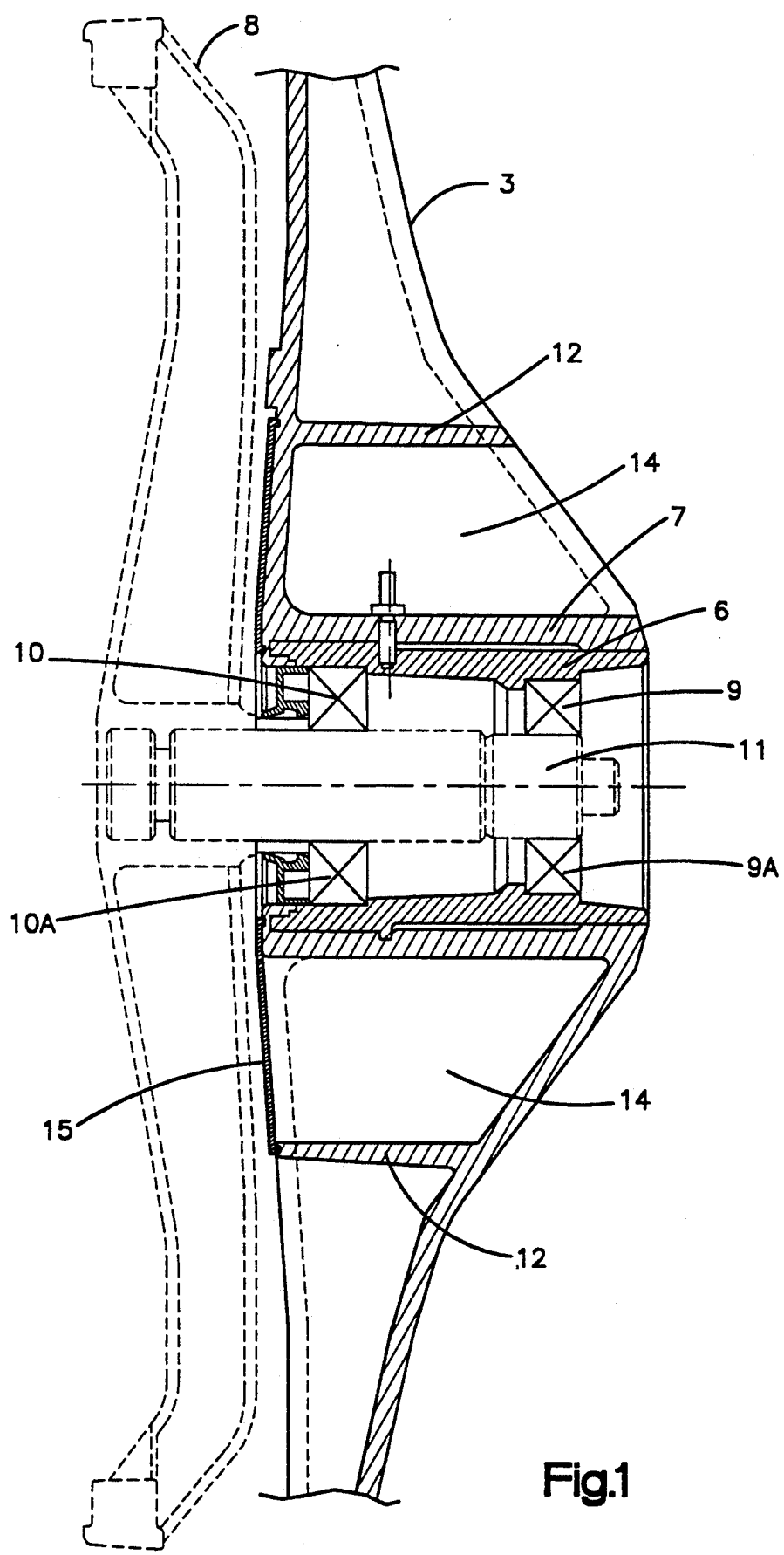
FIG. 1 shows a schematic cross-section of a plastic washtub made in accordance with this invention.
Figure 2:
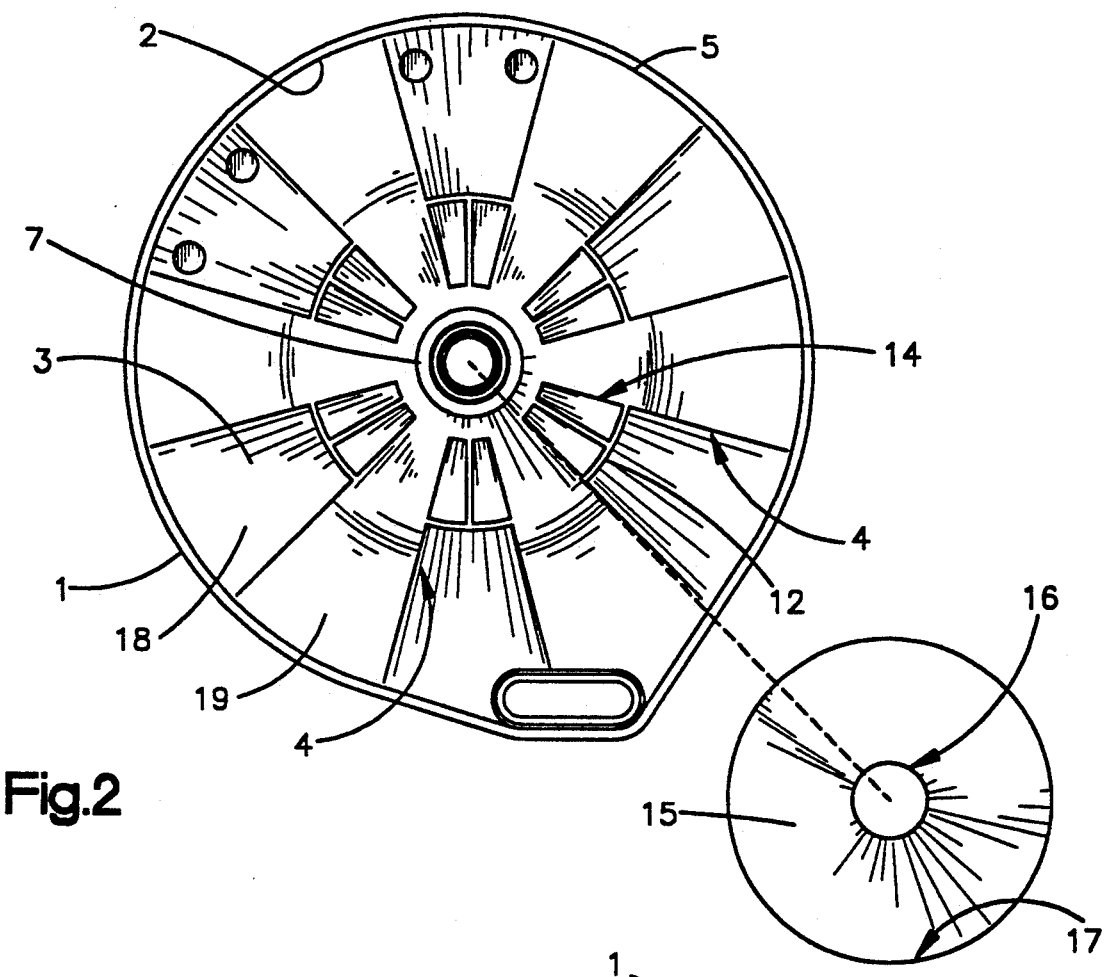
FIG. 2 shows a top view of the tub of FIG. 1 with the protection removed.

Referring to the figures, a plastic washtub (1) is shown such as is known to be used in clothes-washing machines. It is substantially made of a rigid structure formed by a cylindrical wall (2) and a circular bottom wall (3). The washtub also includes a separate top wall (not shown), also circular in form, suitable for attachment to the rigid structure by traditional techniques.

The bottom (3) may ordinarily have numerous, straight, rigid ribs (4) spaced at equal angles and extending radially from the center of the bottom. A hub (6), is inserted into the central part of a cylindrical hub-housing (7) of the bottom (3). The hub supports a central shaft (11) which supports a rotor (8) by means of paired bearings (9, 9a and 10, 10a) placed in a well-known manner on the inner wall of the hub, and whose use is also known.

The bottom (3) is substantially a fretwork with more or less alternating deep (18) and shallow (19) portions, and with demarcation lines of alternating depth between such portions formed by the ribbing (4).

This straight ribbing (4) is interleaved for greater strength by at least one circular collar (12) formed in one piece with the bottom wall (3) of the tub. The collar, the bottom wall (3) and the walls that join the alternatingdepth portions of the bottom of the tub, create a number of cavities (14) adjacent to the central cylindrical hubhousing (7).

During operation, the washing liquid flows into the cavities (14), causing the thermal shocks mentioned earlier.

To prevent this problem, the invention consists of providing a heat-protective "little collar," substantially made up of one or more closed chambers arranged contiguously within the circular plastic collar (12), so as to wrap around the hub-housing completely.

Ideally (referring to the foregoing description and drawings), these closed chambers are produced by simply providing a means of protection (15), preferably flat, plastic and circular, with a circular opening (16) in its center.

Figure 3:
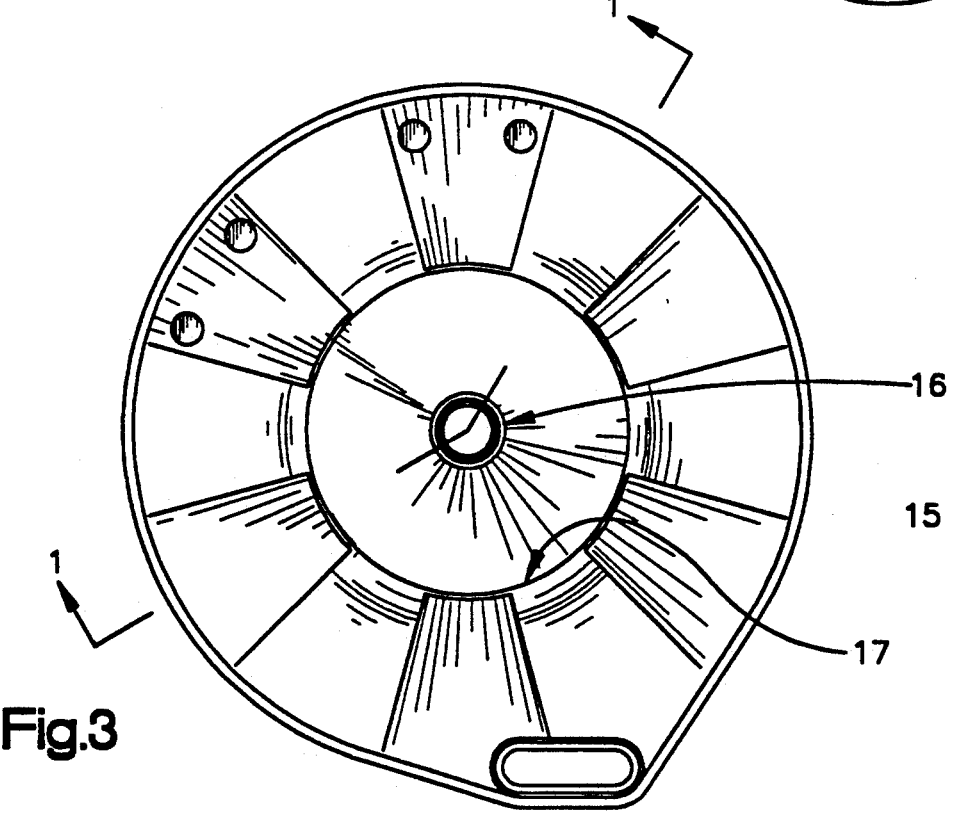
FIG. 3 shows a top view of the tub in FIG. 1 with the protection in its proper place.

This protection is applied, as shown in FIG. 3, along the bottom wall (3) of the tub, with such dimensions that its outer edges (17) correspond to the circular collar (12), and its inner edges to the cylindrical circular hubhousing (7).

Once this protection has been applied, the outside (17) and inside edges are closed and sealed (by welding or other known means) to the collar (12) and cylindrical hubhousing (7), respectively, so as to transform these cavities (14) into corresponding closed chambers.

In this way, the exterior of the hub-housing (7) no longer comes into direct contact with the washing liquid and, as laboratory tests have exhaustively demonstrated, the temperature of this hub-housing (7) is kept low and constant enough to completely avoid the undesirable effects reported above.

This plastic protection, even in its simplicity of construction, proves to be particularly effective; since it is not subject to mechanical stresses, even if it does come into contact with the washing liquid, it does not warp or come away from its closure.

Obviously, any tub (1) can be made with forms different from that shown without thereby going beyond the protective scope of this invention.

A tub assembly improved in this way is produced simply, reliably and economically.

What we claim is:

1. A plastic washtub used in a clothes-washing machine, having a rigid structure (1) made up of a cylindrical wall (2) around a circumference and a circular bottom-wall; a circular front-wall, that can be attached to said rigid structure; a cylindrical hubhousing (7) formed in the bottom wall and circled by one or more closed, empty chambers adjacent to the hub-housing (7) so that the hub-housing (7) does not come into contact with washing liquid; and a hub (6), placed through the center of the bottom wall, which si inserted into a central portion of the cylindrical hub-housing (7) and which supports a central shaft (11) of a rotor (8), characterized in that the bottom-wall (3) is made substantially in the form of fretwork, with portions alternately shallower and deeper, delimited by suitable ribs (4) orthogonal to the bottom-wall and by at least one circular collar (12) made in the bottom (3) of the washtub extending from the bottom to the height of these ribs, the collar (12), bottom wall (3) and ribs (40 being arranged to form a plurality of cavities (14) adjacent to the cylindrical central hub-housing portion (7), the washtub being fitted with protection means (15), being substantially flat, of plastic, circular in form, and with a circular opening (16) in the center, the protection means being applied in a watertight manner against the central hub-housing (7), against the edge of the collar (12) and against the ribs of the washtub bottom, so as to transform those cavities (14) into corresponding closed chambers.

* * * * *

UNITED STATES PATENT AND TRADEMARK OFFICE
CERTIFICATE OF CORRECTION

PATENT NO. : 5,329,791

DATED : July 19, 1994

INVENTOR(S) : Cargnel et al.

It is certified that error appears in the above-identified patent and that said Letters Patent is hereby corrected as shown below:

Column 3, lines 6 and 7, (Claim 1, lines 3 and 4), delete "bottom-wall;" and insert --bottom-wall (3);--; and line 13, (Claim 1, line 10), delete "si" and insert --is--.

Column 4, line 6, (Claim 1, line 19), delete "(40" and insert --(4)--.

Signed and Sealed this

Seventeenth Day of January, 1995

Attest:

BRUCE LEHMAN

*Attesting Officer*     *Commissioner of Patents and Trademarks*